Patented Aug. 14, 1951

2,563,855

UNITED STATES PATENT OFFICE 2,563,855

METHOD FOR IMPROVING FRUIT PRODUCTS

Robert J. McColloch, Pasadena, and Elmer A. Beavens, Alhambra, Calif., assignors to the United States of America as represented by the Secretary of Agriculture No Drawing. Application March 24, 1950, Serial No. 151,831

6 Claims. (Cl. 99—100)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the processing of fruit products, particularly citrus products.

One object of this invention is to provide methods for preventing the formation of clumps and/or gel-like structures in fruit products, without resorting to the necessity of heating the fruit product to inactivate the natural enzymes present therein.

Another object of this invention is to provide methods for the destruction of the bitter flavoring materials which may form in various fruit products, in particular the characteristic bitter flavoring which frequently appears in navel orange products when they are heated or allowed to stand.

Further objects and advantages of this invention will be obvious from the description herein.

A problem which has confronted the fruit processing industry for many years is the matter of clumping or gel formation in fruit products, particularly those which have not been subjected to any heat treatment to inactivate the naturally-occurring enzymes. Thus, oftentimes a fruit product, such as a fruit juice, upon first being prepared appears to be in satisfactory condition; however upon standing, it is observed that clumps or gel-like structures are formed in the product. This phenomenon, of course, lowers the value of the product and causes serious losses to the processor. It is believed that gel formation or clumping is the result of the enzymatic action of one of the natural fruit enzymes, pectin-methylesterase (also known as pectinesterase), which produces pectic acid from the natural pectin in the fruit. Such pectic acid is a highly insoluble compound which has a marked tendency to form gels in the presence of polyvalent metal ions such as would be naturally present in all fruits. In many cases, the tendency of the fruit product to gel can be prevented by subjecting the product to heat to inactivate the naturally-occurring enzymes. However, in many cases it is undesirable to subject the product to such treatment as the heating tends to develop off-flavors such as a "burnt" flavor and in the case of orange products heating tends to accelerate the development of a characteristic bitter flavor.

It has now been found that the tendency for fruit products to clump or gel can be prevented by adding to them the enzyme pectic acid-depolymerase. A particularly desirable source of this enzyme is a preparation derived from tomatoes as set forth hereinafter. This enzyme alleviates the gelling problem by depolymerizing the pectic acid formed by the action of pectin-methylesterase thereby reducing the molecular weight of the pectic acid to such an extent that it is no longer able to form gels or clumps. Thus by adding the aforesaid enzyme to the fruit product we can prevent formation of clumps or gels, without resorting to the necessity of heating the fruit product to inactivate the natural enzymes present therein.

It has also been found that the pectic acid-depolymerase enzyme further destroys, prevents, or otherwise renders impotent the bitter taste which often develops in fruit products, particularly in navel orange products. Thus we can add the enzyme to fruit products whereby the development of bitter flavors is prevented. Further, if the bitter flavor is already present, addition of the enzyme will remove the bitter flavor. Thus in using the enzyme to control bitterness, the enzyme can be added to fruit products which have or have not been first subjected to heat treatment. Although the mechanism of the debittering is not known for sure and it is not possible to state definitely that any one enzyme in the preparation is solely responsible for the debittering action, the rate of debittering seems to be related to the amount of pectic acid-depolymerase in the enzyme preparation. Thus we believe that the debittering action of the tomato enzyme preparation is due to its content of pectic acid-depolymerase.

It is known in the art that pectin may be removed from fruit preparations by treating them with commercial pectinase preparations. These preparations, usually produced by culturing various fungi such as *Aspergillus niger* on suitable media, contain pectin-methylesterase and pectin-polygalacturonase. However such pectinase preparations do not have the same effect as does the enzyme preparation which we use. In the first place, we have found that pectinase preparations are entirely unsuitable as they cause development of off-flavors in the fruit product. When our enzyme preparation is used, no off-flavors are developed, on the contrary, the flavor is improved as explained hereinabove. In the second place, the enzymes in the pectinase preparations are entirely different from those in our preparation. As one example, when the pectinase preparation is used, it completely hydrolyzes the pectin to galacturonic acid and thus causes a distinct liquefying and clarifying action on the fruit product. The enzymes in our tomato enzyme preparation do not completely hydrolyze the pectin to galacturonic acid but merely depolymerize the pectic acid to such an extent that it no longer forms gels with polyvalent metal ions. As a result gel formation is prevented without producing such marked liquefaction and clarification as is the case with pectinase preparation. In other words, our enzyme preparation has the property of depolymerizing pectic acid to such an extent that it no longer forms a gel but it does not cause the complete hydrolysis, liquefaction, and clarification as does pectinase preparations.

We have compared the action of our enzyme preparation and a fungal pectinase preparation on pectic acid. In these studies the degree of hydrolysis of the pectic acid was followed by noting the increase in reducing power as the hydrolysis proceeded. In the case of our enzyme preparation, a maximum reducing power in the range 40–45% of the theoretical is reached and further additions of the enzyme will not further advance the hydrolysis. In the case of the fungal pectinase preparation, the theoretical 100% calculated reducing power is reached. These experimental findings are a clear indication that our enzyme does not cause a complete hydrolysis to galacturonic acid as does the fungal pectinase preparation.

Our process may be applied to all types of fruit products particularly those of an essentially liquid character such as juices, purees, concentrated juices, concentrated purees, juices or purees containing whole or divided fruits, and so on. The invention is particularly adapted to the treatment of citrus products, especially orange products, since such products are particularly sensitive to heat and it is highly desirable to prepare citrus products without resorting to any blanching treatment. By application of our invention, non-gelling citrus products may thus be prepared without first destroying the enzymes by heat treatment. Further, the invention is particularly adapted to the treatment of citrus products because these are especially prone to develop bitter flavors. By the use of our process, the development of bitterness is prevented and even already-developed bitterness can be removed. The proportion of enzyme preparation to be used in any case will of course depend upon many factors such as the kind of fruit product, the amount of active enzyme in the enzyme preparation and so forth. In any particular case, the proper proportion of enzyme preparation can readily be determined by adding varying amounts of the enzyme preparation to several samples of the fruit product, allowing the samples to stand and noting the ones which exhibit the proper freedom from gelling and/or bitterness. It is obvious that the enzyme preparation can be added to the fruit product at various stages in its production.

For example, in preparing a frozen or canned juice the enzyme preparation may be added immediately prior to the packaging operation. In preparing concentrated juices or purees, the enzyme is generally added subsequent to the concentration step. The method by which the fruit product is preserved is immaterial to this invention and the product containing the enzyme may be preserved by freezing or canning or by any other means.

The following examples demonstrate the invention in greater detail. It is understood that these examples are furnished only by way of illustration and not limitation.

The pectic acid-depolymerase preparation used in the examples was prepared as follows:

40 lbs. of Pearson tomatoes were comminuted and the clear serum pressed out through a filter cloth. The remaining solids were extracted at room temperature for three days by standing with a sufficient volume of saturated aqueous sodium chloride solution (adjusted to a pH of 4.5 to 5.0) to cover the solids. The salt solution extract was then filtered from the solids through a cloth and dialyzed against distilled water until salt-free as indicated by testing a small portion with silver nitrate solution. The precipitate which formed at this point was separated by centrifugation from the supernatant and redissolved in 200 ml. of saturated sodium chloride solution and the undissolved material separated by filtration. The clear, filtered solution constituted the pectic acid-depolymerase preparation employed in the examples. Since the concentration of pectic acid-depolymerase is difficult to measure and is closely related to the content of pectin-methylesterase, the activity of our enzyme preparation is expressed in terms of the pectin-methylesterase units it contains. On this basis, the preparation contained about 50 pectin-methylesterase units per ml. It is to be emphasized that although our enzyme preparation contains pectin-methylesterase in addition to pectic acid-depolymerase, the critical activity of the preparation is due to its content of the latter enzyme; the content of pectin-methylesterase merely being used as a convenient means of measuring concentration.

In the preparation of the tomato enzyme material, it is essential that the extraction of the tomato solids be carried out at a pH not above 5.5, the pH range generally preferred being about 4.5 to 5.0. We have found that extraction of the tomato solids at a pH above 5.5 results in a gradual inactivation of the pectic acid-depolymerase and such a tomato enzyme preparation is unsuitable for our purposes. The concentration and kind of salt used, commonly sodium chloride, is not critical although we prefer to employ either 10% or saturated sodium chloride solutions for the highest yields.

EXAMPLE I

A batch of whole Navel orange puree was divided into three samples.

A. One sample of the puree was mixed with the pectic acid-depolymerase preparation using 5 ml. of the enzyme preparation per gallon of puree.

B. The second sample was blanched at 198° F. for 2 minutes to destroy its content of pectin-methylesterase.

C. The third sample was given no treatment whatever.

The samples were then placed in a refrigerator and maintained in a frozen state. After storage for 3 months, the samples were examined. It was found that samples A and B had not gelled whereas sample C had formed a gel. An additional examination after frozen storage for 4 months showed that sample B had become bitter whereas sample A was entirely free from bitterness and actually had an improved flavor and color as compared with both B and C.

The results are tabulated below:

*Table*

| Sample | Treatment | Condition after storage | Flavor after storage |
|---|---|---|---|
| A | pectic acid—depolymerase added | no gel | good.[1] |
| B | blanched 198° F., 2 min | do | bitter. |
| C | none | gelled | |

[1] Entirely free of bitterness—flavor and color better than B and C.

EXAMPLE II

A 500 ml. sample of single strength Navel orange juice was heated to develop bitterness. To the sample of juice was then added 0.5 ml. of the pectic acid-depolymerase preparation and the juice stored overnight at 50° F. In 12 to 24 hours the bitterness was gone.

EXAMPLE III

Samples of Navel orange juice were prepared. To half the samples there was added the pectic acid-depolymerase enzyme preparation (1 ml. enzyme preparation per liter of juice). The remaining samples were untreated thus serving as controls. The samples were then stored at 50° F. After 12 to 24 hours' storage at this temperature, it was observed that the control samples were bitter whereas the samples containing the added enzyme were not bitter. The experiment was repeated using a storage temperature of 38° F. It was again noted that after 12 to 24 hours' storage the control samples were bitter whereas the samples containing added enzyme were not bitter.

EXAMPLE IV

A four-to-one Navel orange juice concentrate was prepared. This product had a bitter flavor. To one liter of the concentrate was added 1 ml. of the pectic-acid depolymerase enzyme preparation. The treated juice was stored at 38° F. for 4 days, then examined. It was found to be completely free from bitterness.

Having thus described our invention, we claim:

1. The process of improving fruit products which comprises incorporating therewith the enzyme pectic acid-depolymerase.

2. The process of improving citrus products which comprises incorporating therewith the enzyme pectic acid-depolymerase.

3. The process of improving orange products which comprises incorporating therewith the enezyme pectic acid-depolymerase.

4. A fruit product having incorporated therewith the enzyme pectic acid-depolymerase.

5. A citrus product having incorporated therewith the enzyme pectic acid-depolymerase.

6. An orange product having incorporated therewith the enzyme pectic acid-depolymerase.

ROBERT J. McCOLLOCH.
ELMER A. BEAVENS.

REFERENCES CITED

The following references are of record in the file of this patent:

UNITED STATES PATENTS

| Number | Name | Date |
|---|---|---|
| 2,419,930 | Wilson | Apr. 29, 1947 |

OTHER REFERENCES

Enzymes, by Sumner and Somers, 1943, pages 103 to 108.